(12) United States Patent
Akarapu et al.

(10) Patent No.: US 9,645,313 B2
(45) Date of Patent: May 9, 2017

(54) QUANTUM CASCADE LASER DEVICES AND METHODS FOR OPTICAL-FIBER PROCESSING FOR CONNECTOR APPLICATIONS

(71) Applicant: CORNING OPTICAL COMMUNICATIONS LLC, Hickory, NC (US)

(72) Inventors: Ravindra Kumar Akarapu, Painted Post, NY (US); Venkata Adiseshaiah Bhagavatula, Big Flats, NY (US); Vikram Bhatia, Painted Post, NY (US); John Himmelreich, Horseheads, NY (US)

(73) Assignee: Corning Optical Communications LLC, Hickory, NC (US)

(*) Notice: Subject to any disclaimer, the term of this patent is extended or adjusted under 35 U.S.C. 154(b) by 175 days.

(21) Appl. No.: 14/791,953

(22) Filed: Jul. 6, 2015

(65) Prior Publication Data
US 2016/0340241 A1    Nov. 24, 2016

Related U.S. Application Data

(60) Provisional application No. 62/165,322, filed on May 22, 2015.

(30) Foreign Application Priority Data

May 22, 2015  (EP) ..................................... 15168893

(51) Int. Cl.
*G02B 6/32* (2006.01)
*G02B 6/25* (2006.01)
(Continued)

(52) U.S. Cl.
CPC .......... *G02B 6/2552* (2013.01); *B24B 19/226* (2013.01); *C03C 25/6233* (2013.01);
(Continued)

(58) Field of Classification Search
None
See application file for complete search history.

(56) References Cited

U.S. PATENT DOCUMENTS 5,011,254 A * 4/1991 Edwards .............. G02B 6/4203
385/33
5,226,101 A    7/1993 Szentesi et al. ................ 385/85
(Continued)

FOREIGN PATENT DOCUMENTS

JP          4959647    6/2012    .............. G02B 6/02
WO   WO2015045481 A1    4/2015    .............. G02B 6/42

OTHER PUBLICATIONS

Scanning Laser System Optics: CO2 Laser Optics, iiviinfrared.com, downloaded from Internet on May 9, 2016, 3 pages.

*Primary Examiner* — Michelle R Connelly

(57) ABSTRACT

Devices and methods for optical-fiber processing for connector applications are disclosed, wherein the devices and methods utilize a quantum cascade laser operated under select processing parameters to carry out end face polishing. The method includes supporting the optical fiber in a ferrule so that a bare end section of the fiber protrudes from an end of the ferrule by a protrusion distance. The method then includes irradiating the end face with light from the quantum cascade laser to polish the end face. The quantum cascade laser can also be used to form a bump in a central portion of the end face, wherein the bump facilitates physical contact between respective end faces of connected optical fibers.

22 Claims, 7 Drawing Sheets

(51) Int. Cl.
*G02B 6/255* (2006.01)
*G02B 6/26* (2006.01)
*C03C 25/62* (2006.01)
*B24B 19/22* (2006.01)
*G02B 6/38* (2006.01)

(52) U.S. Cl.
CPC ............. *G02B 6/25* (2013.01); *G02B 6/262* (2013.01); *G02B 6/32* (2013.01); *G02B 6/381* (2013.01)

(56) References Cited

U.S. PATENT DOCUMENTS

| | | | |
|---|---|---|---|
| 5,256,851 A * | 10/1993 | Presby | G02B 6/4203 219/121.66 |
| 5,317,661 A | 5/1994 | Szentesi et al. | 385/31 |
| 5,772,720 A | 6/1998 | Taira-Griffin et al. | 65/387 |
| 6,317,550 B2 * | 11/2001 | Irie | 385/123 |
| 6,361,219 B1 | 3/2002 | Blyler, Jr. et al. | 385/85 |
| 6,413,450 B1 * | 7/2002 | Mays, Jr. | G02B 6/2552 219/121.72 |
| 6,415,087 B1 * | 7/2002 | Yang | B24B 19/226 385/123 |
| 6,822,190 B2 | 11/2004 | Smithson et al. | 219/121.69 |
| 7,082,250 B2 * | 7/2006 | Jones | G02B 6/3833 219/121.61 |
| 7,515,789 B2 * | 4/2009 | Cheng | B29D 11/00663 385/33 |
| 9,205,610 B1 | 12/2015 | Danley | |
| 2005/0094945 A1 * | 5/2005 | Danley | B23K 26/0823 385/78 |
| 2010/0021867 A1 * | 1/2010 | Altshuler | A61C 1/0046 433/215 |
| 2010/0303419 A1 * | 12/2010 | Benjamin | G02B 6/02342 385/72 |
| 2014/0079354 A1 * | 3/2014 | Aoki | G02B 6/38 385/72 |
| 2014/0199027 A1 * | 7/2014 | Miller | G02B 6/3854 385/72 |
| 2015/0218038 A1 * | 8/2015 | Carberry | C03B 37/16 65/392 |
| 2015/0355416 A1 * | 12/2015 | Liu | G02B 6/3863 65/378 |
| 2016/0062040 A1 * | 3/2016 | Hodge | G02B 6/3855 385/80 |

* cited by examiner

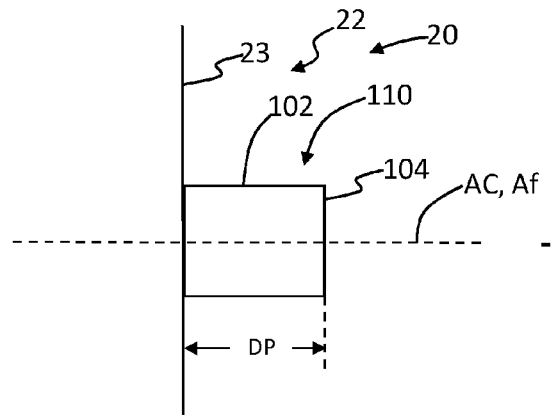
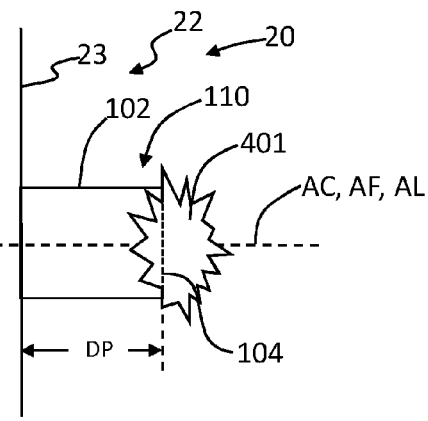
FIG. 2C          FIG. 2D
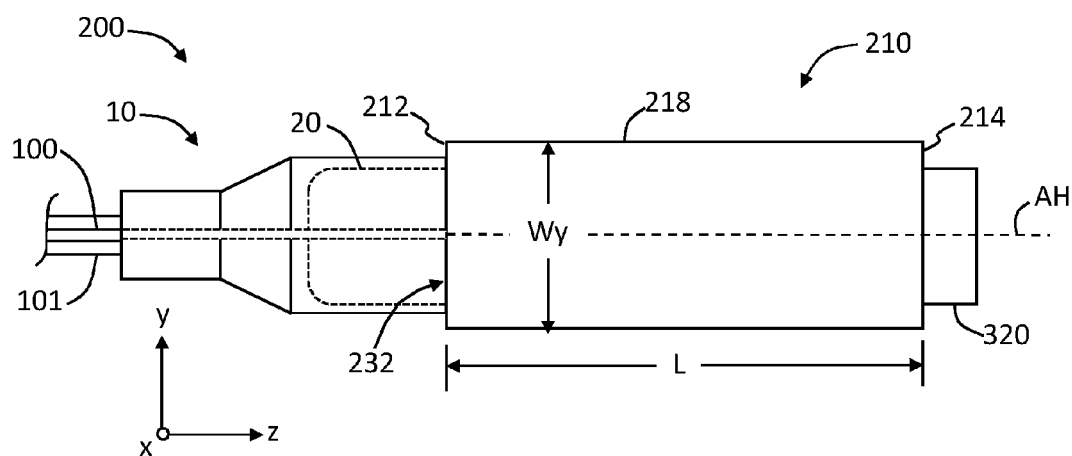
FIG. 3A

QUANTUM CASCADE LASER DEVICES AND METHODS FOR OPTICAL-FIBER PROCESSING FOR CONNECTOR APPLICATIONS

PRIORITY APPLICATIONS

This application claims the benefit of priority of U.S. Application Ser. No. 62/165,322, filed on May 22, 2015, and also claims the benefit of priority of European Patent Application Serial No. 15168893.4, filed on May 22, 2015, both applications being incorporated herein by reference.

FIELD

The present disclosure relates to the laser processing of optical fibers for optical fiber connector applications, and in particular to a quantum cascade laser devices and methods for laser processing optical fibers for connector applications.

BACKGROUND

Optical fibers are used in a variety of optical and telecommunications applications. Optical fiber connectors are used to connect two optical fibers so that the optical communication can take place between the two connected fibers. Often the optical fiber connectors are installed in the field, with such connectors being referred to as "field-installable connectors." As the name implies, the connectors are installed in less than ideal circumstances for precision assembly. Consequently, such connectors and assembly processes need to be simple and reliable while meeting stringent performance requirements. Also, the tools used for the connector installation need to be portable, easy to use, rugged and preferably battery operated.

The assembly of connectors involves several steps, including the end preparation of the optical fibers to be connectorized. In general, end preparation involves four main process steps: (1) stripping the polymer coating to expose a select length of the bare glass fiber; (2) precision cleaving the bare glass fiber section with controlled end angles and surface quality; (3) inserting the optical fiber in a ferrule of the connector to have a controlled protrusion distance from the ferrule; and (4) polishing the end of the optical fiber that protrudes from the ferrule.

The first step is currently done manually using a mechanical stripper. This process can introduce flaws in the glass fiber that can reduce the optical fiber strength. Consequently, a non-mechanical coating stripping process that does not cause flaws in the glass fiber are desired. To get a controlled protrusion distance and a high-quality fiber end surface, the end of the optical fiber is polished after fixing the optical fiber in the connector ferrule. Generally, this involves several polishing steps with progressively finer polishing pads. The polishing pads need to be replaced after each connector assembly, particularly the final polishing pad. This is a time consuming process whose outcome is very much operator dependent.

It is therefore desirable to simplify the steps for the end preparation of the optical fibers, and in particular eliminate the iterative manual polishing process.

SUMMARY

An aspect of the disclosure is a method of processing an optical fiber having a coating formed on a glass waveguide that includes an end face having a diameter. The method includes: supporting the optical fiber in a ferrule so that a bare end section of the optical fiber that includes the end face protrudes from an end of the ferrule by a protrusion distance DP; and irradiating the end face of the bare end section with light from a quantum cascade laser (QCL) to polish the end face. The light has a wavelength in the range from 5.5 microns to 10.6 microns, forms a focus spot substantially at the end face having a diameter that is 10% to 110% of the diameter of the end face, and has an average power in the range from 50 mW to 600 mW.

Another aspect of the disclosure is a method of processing an optical fiber having a coating formed on a glass waveguide that includes an end face. The method includes: a) supporting the optical fiber in a ferrule having a ferrule front end with a ferrule front-end surface, with the optical fiber having a bare end portion formed by the glass waveguide, and wherein the bare end portion includes the end face and protrudes beyond the ferrule front-end surface by a protrusion distance DP; b) irradiating the end face of the bare end portion with focused light from a quantum cascade laser (QCL) to polish the end face; and c) forming a bump on a central portion of the end face, the bump having a diameter in the range from 25 microns to 75 microns and a height in the range from 50 nm to 100 nm, and wherein the protrusion distance DP and bump height are such that the end face does not protrude more than 250 nm beyond the ferrule front-end surface.

Another aspect of the disclosure is a device for processing an optical fiber supported by a ferrule having a front-end section, the optical fiber having a coating formed on a glass waveguide that includes an end face having a diameter. The device includes: a housing having a housing axis, an open front end, a back end, and an interior, wherein the open front end is configured to receive and engage the front-end section of the ferrule, with a bare end portion of the optical fiber protruding from the front-end section; a stop member arranged along the housing axis and spaced apart from the open front end of the housing, the stop member being configured so that the ferrule front-end section can be inserted into and engaged by the open front end of the housing, and wherein the stop member has an aperture that resides on the housing axis; a quantum cascade laser (QCL) operably arranged within the interior of the housing and that emits light having a wavelength; and a focusing lens system operably arranged between the stop member and the QCL and that is configured to receive the light from the QCL and form a focus spot at a front focus position that is substantially at the aperture of the stop member; wherein, when the ferrule engages the open front end of the housing, the end face of the optical fiber resides substantially at the aperture of the stop member and is irradiated by the focus spot that acts to polish the end face of the optical fiber.

Advantages of the methods and devices disclosed herein include a relatively low amount of average power needed to perform end face polishing by using laser pulses rather than continuous-wave operation. Another advantage is the relatively small heat load generated by the QCL, which translates into a reduction in size, cost and complexity of the device. Another advantage is a relatively short processing time accomplished in part by using a high peak optical power via pulsed operation with a small duty cycle.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which:

FIG. 2C is a close-up view of the front end of the ferrule and optical fiber of FIG. 2B, showing an example wherein some of the bare (stripped) end portion of the optical fiber extends beyond front-end surface of ferrule front end by a protrusion distance DP;

FIG. 2D is similar to FIG. 2C, and shows a focus spot formed at the end face of the bare end portion of the optical fiber that protrudes from the ferrule front-end surface;

FIG. 3A is a side view of an example quantum cascade laser (QCL) device ("QCL tool") according to the disclosure, shown along with an optical fiber connector operably engaged at the front end of the QCL tool for processing the end face of the optical fiber;

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Ferrule and Optical Fiber

Figure 1:
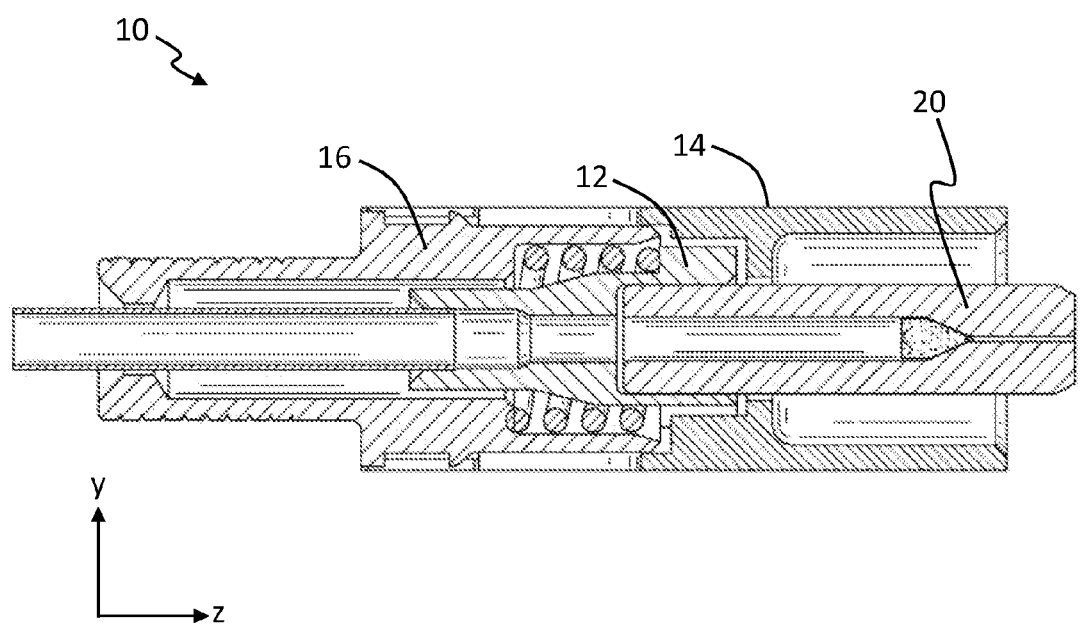
FIG. 1 is a cross-sectional view in the y-z plane of an example optical fiber connector.

FIG. 1 is a cross-sectional view in the y-z plane of an example optical fiber connector 10 (also referred to as "fiber optic connector 10", or simply "connector 10"), which includes a ferrule 20 configured to support an optical fiber 100 (see FIG. 2B), a ferrule holder 12 from which ferrule 20 extends, a housing 14 having a cavity in which ferrule holder 12 is received, and a connector body 16 (also referred to as "inner housing 16", "retention body 16", or "crimp body 16") configured to retain ferrule holder 12 within housing 14. Connector 10 is merely an example to facilitate discussion. Thus, although connector 10 is shown in the form of a SC-type connector, the disclosure below may be applicable to processes and apparatuses involving different fiber optic connector and ferrule designs. This includes ST, LC, FC, MU, and MPO-type connectors, for example, and other single-fiber or multi-fiber connector or ferrule designs.

Figure 2A:
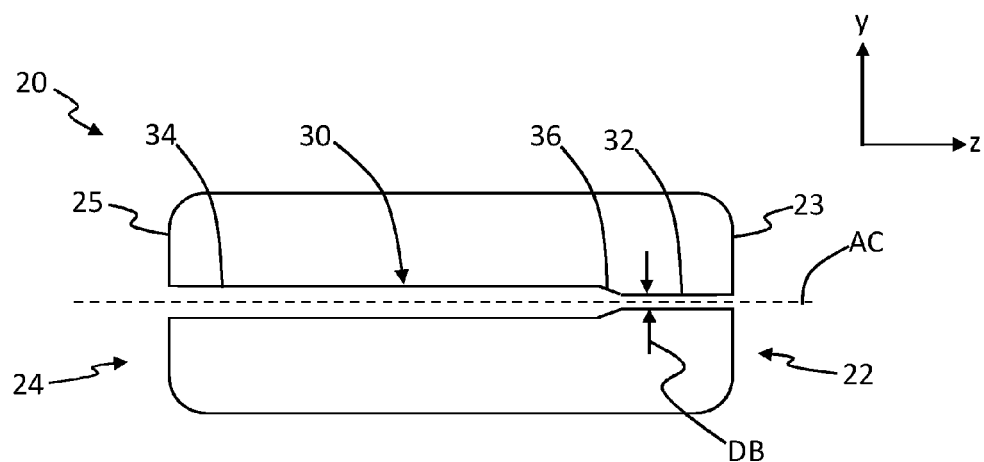
FIG. 2A is a cross-sectional view in the y-z plane of an example ferrule.
Figure 2B:
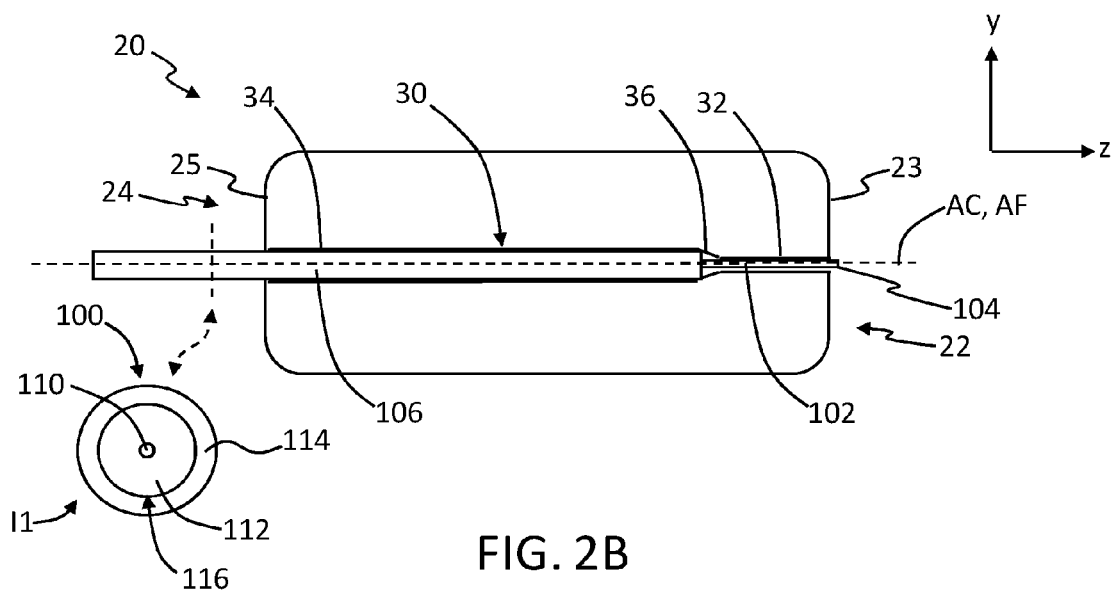
FIG. 2B similar to FIG. 2A and shows the ferrule of FIG. 2A holding an optical fiber.

With this in mind, FIG. 2A schematically illustrates ferrule 20 in isolation, while FIG. 2B similar to FIG. 2A and shows the ferrule holding optical fiber 100, which has a central axis AC. Ferrule 20 includes a front end 22 with a front-end surface 23, a back end 24 with a back-end surface 25, and a central bore 30 that runs along ferrule central axis AC between the front and back ends. The central bore 30 includes a front-end section 32 of diameter DB sized to accommodate a bare end portion 102 (or "bare end section 102") of optical fiber 100, wherein the bare end portion terminates at an end face 104. The central bore 30 also includes a back-end section 34 sized to accommodate a coated portion 106 (or "coated section 106") of optical fiber 100. The front-end and back-end sections 32 and 34 of bore 30 transition at an interior wall 36, which in example can be angled toward front end 22 as shown to help guide bare end portion 102 into front-end section 32 of bore 30. In an example, ferrule 20 is made of a ceramic material such as Zirconia.

The close-up inset 11 of FIG. 2B shows an example cross-sectional view of optical fiber 100. Optical fiber 100 includes a core 110, a cladding 112 that surrounds the core, and a coating 114 that surrounds the cladding. The core 110 and cladding 112 define an optical waveguide 116, while coating 114 serves a protective (i.e., non-waveguide) function. The bare end portion 102 is formed by stripping away a select amount of coating 114, leaving just cladding 110 and core 112. In an example, coating 114 is made of acrylate, a polymer, or like material. The core 110 and cladding 112 are typically made of glass, e.g., silica, and one or both can include dopants that define a refractive index profile for optical fiber 100. Thus, in an example, optical waveguide 116 is a glass waveguide. Single mode optical fibers 100 can have a core diameter of about 9 microns while multimode optical fibers can have a core diameter of about 50 microns or about 62.5 micron, while a typical optical fiber diameter (i.e., cladding outer diameter) is about 125 microns.

FIG. 2C is a close-up view of ferrule front end 22 that shows an example wherein some of bare end portion 102 of optical fiber 100 extends beyond front-end surface 23 of ferrule front end 22 by a protrusion distance DP. In an example, DP 250 nm. This configuration of the optical fiber 100 in ferrule 20 is typically accomplished by a conditioning step that involves coarse polishing fiber end face 104 of bare end portion 102. Such coarse polishing invariably creates scratch marks and other defects in end face 102.

Consequently, after the coarse polishing step, end face 104 needs to be further polished to eliminate or minimize the scratch marks and other defects. The QCL device disclosed herein is used as a tool to perform non-contact processing of fiber end face 104 to form a highly polished end face in a single polishing step. FIG. 2D is similar to FIG. 2C, and shows a focus spot 401 formed substantially at (e.g., to within +/−100 microns of) end face 104 of the bare end portion 102 in carrying out the non-contact polishing method, as described in greater detail below. Without such scratch/defect removal, connector optical performance specifications, such as insertion loss (IL) and back reflection (BR), cannot be met. Also, with the defect and flaws introduced during the conditioning step, end face 104 of optical fiber 100 may be prone to chipping with repeated connector matings and dematings. The QCL device and polishing methods described below may be applicable to both ultra physical contact (UPC) end faces and angled physical contact (APC) end faces. Thus although end face 104 may be shown as flat or substantially flat in most figures, it will be appreciated that end face 104 may alternatively be slightly angled relative to fiber axis AF.

The QCL Tool

Figure 3B:
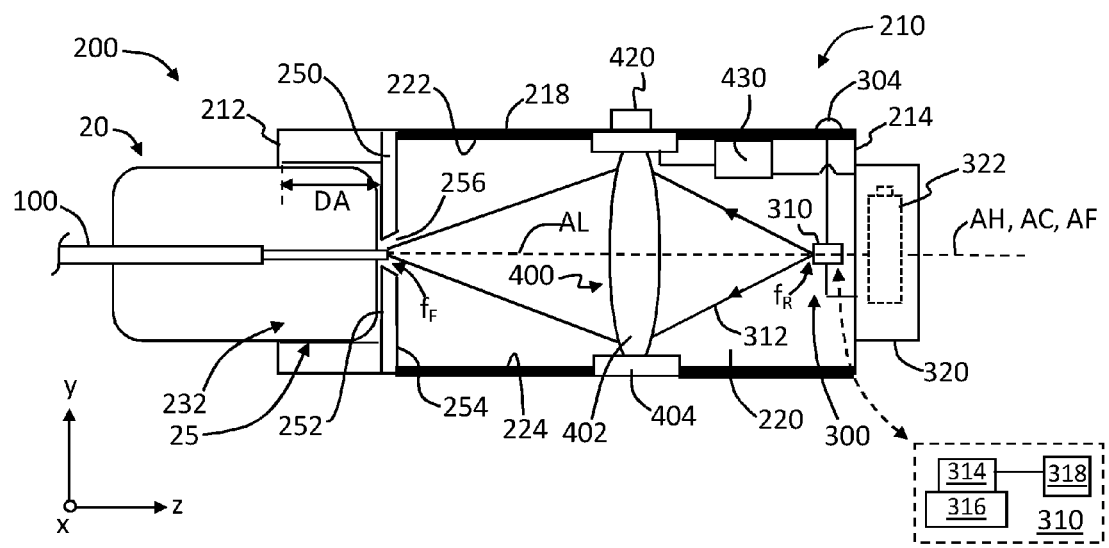
FIGS. 3B and 3C are cross-sectional views of examples of the QCL tool of FIG. 3A, illustrating two different optional configurations of the tool.
Figure 3C:
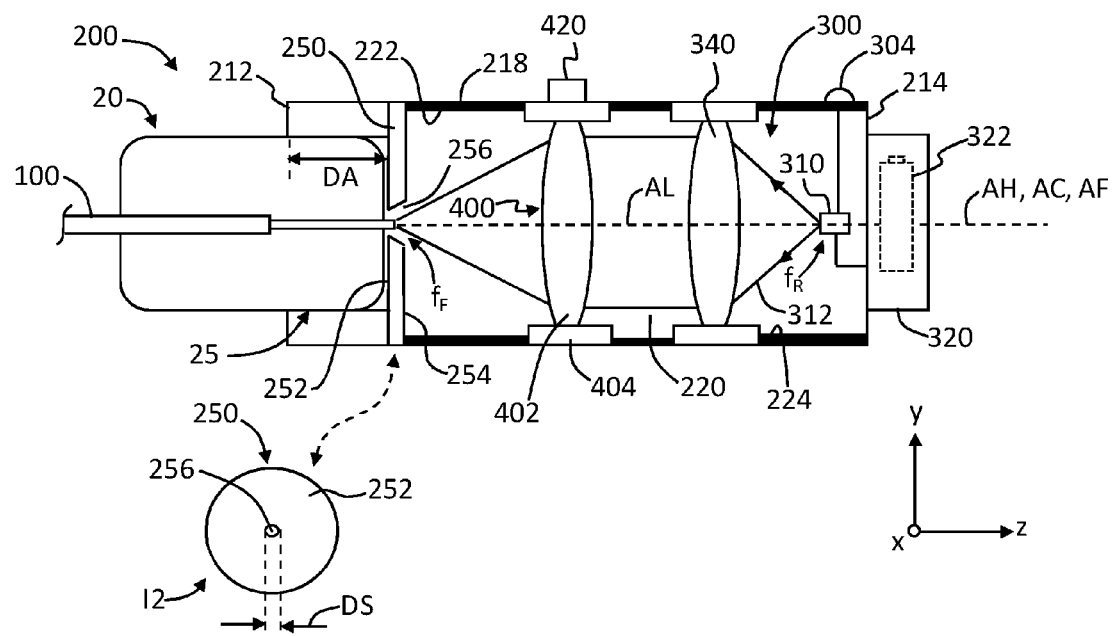

FIG. 3A is a side view of an example QCL device 200 according to the disclosure. FIGS. 3B and 3C are y-z cross-sectional views of QCL device 200 of FIG. 2A illustrating two different optional configurations of the device. Because QCL device 200 is used as a tool for polishing the end face 104 of optical fiber 100, it is referred to hereinafter as "QCL tool" 200.

The QCL tool 200 includes a housing 210 having a central axis AH, a front end 212, a back end 214, an outside surface 218 and an interior 220 (FIG. 3B) that has an interior surface 222. In an example, housing 210 has generally tubular configuration and can be formed from one or more tubular sections. In an example, at least a portion of inner surface 222 of interior 220 is coated with a light-absorbing coating 224. The housing 210 has an axial length L, an x-direction width Wx (not shown) and a y-direction width Wy (FIG. 3A). In an example where housing 10 is cylindrical, then the Wx=Wy=diameter DH. In an example, housing 210 is sized so that QCL tool 200 can be hand-held by a user, such as a field technician. QCL tool 200 may alternatively be setup as a small workstation, possibly on a bench top, for a factory technician.

The front end 212 of housing 220 includes an opening 232 configured to receive and engage a portion 25 of ferrule 20 at front end 22 (i.e., "front-end portion" 25), as shown in FIGS. 3B and 2C. In an example, opening 232 is sized to snugly engage front-end portion 25 of ferrule 20 so that optical fiber 100 is an aligned configuration suitable for end-face polishing, as described below. Ferrule 20 may be part of an optical fiber connector, such as connector 10 of FIG. 1 (not shown in FIGS. 4A-4C) when used in connection with QCL tool 200, and housing 220 may even be sized to extend into the space between ferrule 20 and housing 14. As shown in FIG. 3A, optical fiber 100 can be carried by an optical fiber cable 101.

With reference to FIGS. 3B and 3C, in an example housing 210 includes a stop member 250 operably arranged within interior 220. The stop member 250 includes front surface 252 and a back surface 254, and a central aperture 256 of diameter DS (see close-up inset 12 in FIG. 2C). The stop member 250 is arranged in an x-y plane and is set back from housing front end 212 by a select distance DA, with central aperture 256 centered on housing axis AH. The stop member 250 allows front-end section 25 of ferrule 20 to be inserted into the opening 232 at housing front end 212 to the select axial distance DA.

The QCL tool 200 further includes a QCL light source system 300 arranged in interior 220 along housing central axis AH and adjacent or towards housing back end 214. The QCL light source system 300 includes a QCL unit 310. The QCL unit includes a QCL 314, which is usually in the form of a chip. In an example, QCL unit 310 includes thermal management hardware 316, such as a thermo-electric cooler (TEC) to keep the QCL 314 temperature under precise control for reliable and reproducible performance. The QCL unit 310 also includes a controller 318 operably connected to QCL 314 to control the laser pulses 312 generated thereby.

In an example, QCL light source system 300 is locally powered, e.g., by a battery system 320 that includes one or more batteries 322. The QCL 314 of QCL unit 310 emits light 312 having a nominal wavelength λ in the range from 5.5 microns to 10.4 microns, with an exemplary wavelength being 6.2 microns.

In an example, the QCL light source system 300 is formed as a modular sub-assembly that includes QCL unit 310 as well as other components, such as battery system 320 and other basic components that are not shown, such as wiring, a housing portion, a transmission window that hermetically seals QCL unit 310 in its own environment, etc.

In an example, QCL light source system 300 can be activated using an activation button 304, which is operably connected to the QCL unit 310 and which can be conveniently located on housing outer surface 218. In an example illustrated in FIG. 3C, QCL light source system 300 includes a collimating lens 340 that serves to substantially collimate diverging light 312 from QCL 314.

The QCL device 200 also includes a focusing lens system 400 having an optical axis AL. The focusing lens system 400 is operably disposed within interior 220 between stop member 250 and QCL light source system 300. Focusing lens system 400 is configured to provide either fixed or adjustable focus. In an example, focusing lens system 400 includes one or more lenses 402. In an example, the one or more lenses 402 are supported by an axially movable lens holder 404. In the fixed focus case, the one or more lenses 402 are adjusted precisely in the factory so that the laser focus is precisely aligned to the reference hole 256. This provides a low cost, robust system particularly suitable for field operation, although similar advantages may be obtained when using the system for factory operation.

In another example, at least one of the one or more lenses 402 is axially movable for adjusting focus. Focusing lens system 400 has a front focus $f_F$ located along optical axis AL generally at aperture 256 of stop member 250. In the example shown in FIG. 3B, focusing lens system 400 also has rear focus $f_R$ located on optical axis AL and generally at QCL unit 310. In the example of FIG. 3C, the rear focus is defined by collimating lens 340. The collimating lens 340 can be considered part of focusing lens system 400.

The lens holder 404 may include threads (not shown) that matingly engage threads (not shown) on the inner surface 222 of housing interior 220. The axial movement of focusing lens system 400 (or at least one of lens elements 402 therein) may be initiated via an activation member 420 located on outside surface 218 of housing 210. In an example, activation member 420 includes a dial that is mechanically connected to focusing lens system 400, with the manual movement of the dial causing an axial movement of the focusing lens system or one or more lens elements 402 therein.

In another example, activation member 420 is a button that electrically activates a motor 430 (FIG. 2B) that is operably connected to and that causes the axial movement of at least one lens 402 in response to an electrical signal. Motor 430 is shown electrically connected to and thus powered by battery system 320.

In an example, focusing lens system 400 is configured so that the location of focus spot 401 (see FIG. 2D) can be moved relative to end face 104, e.g., the focus spot can be scanned over the end face. In an example, this is accomplished by axially moving and/or tilting the one or more lens elements 402. The range of focus is such that QCL tool 200 can be setup for polishing operations where end face 104 is generally polished at no angle relative to fiber axis AF (such as for UPC end faces) or at slight angles relative to fiber axis AF (such as at 8 degrees for APC end faces).

General QCL Tool Operation and Method

In the general operation of QCL tool 200, the front-end section 25 of ferrule 20 with optical fiber 100 supported by central bore 30 is inserted into the opening 232 at housing front end 212 of QCL tool 200. This insertion continues until ferrule front-end surface 23 makes contact with the front surface 252 of stop member 250. In this configuration, the ferrule central axis AC, the fiber axis AF, the optical axis AL, and the housing central axis AH are all substantially co-axial and thus in general alignment. At this point, end face 104 of optical fiber 100 resides generally in the plane defined by front surface 252 of stop 250 at central aperture 256 and thus is generally located at front focus $f_F$ of focusing lens system 400.

As discussed above in connection with FIG. 2C, fiber end face 104 of bare end portion 102 of optical fiber 100 may protrude a select distance DP from ferrule front-end surface 23. In an example, optical fiber 100 is bonded within central bore 30 with some of the bare end portion 102 protruding beyond ferrule front-end surface 23 by the aforementioned distance DP. At this point, this protruding bare end portion 102 is polished at end face 104 with a robust polishing pad (e.g., 0.5 micron or 1 micron grit diamond pad) to define the desired protrusion distance DP. Next, end face 104 requires further processing (polishing) because it has the aforementioned scratches and other surface defects that need to be removed subsequent to making an optical connection.

Once front-end section 25 of ferrule 20 is engaged (i.e., mated with) housing 210 at opening 232 at front end 212 per above, then QCL light source system 300 is activated (e.g., via activation button 304). This causes QCL 310 to emit light 312 from rear focus position $f_R$. The emitted light 312 diverges as it travels towards focusing optical system 400 (FIG. 3B) or towards collimating lens 340 (FIG. 3C). The focusing optical system 400 receives emitted light 312 and brings it to a focus at front focus $f_F$ at which resides substantially at fiber end face 104. The focused light 312 passes through aperture 256 of stop member 250 and is incident upon fiber end face 104 as focus spot 401 (see FIG. 2D). In an example, aperture 256 has a diameter DS substantially the same as (e.g., to within +/−10% of) the bore diameter DB of bore front section 32 to avoid irradiating the ferrule front-end surface 23. In an example, diameter DS is in the range from about 100 microns to about 125 microns. Also in an example, aperture 256 of stop member 250 can be tapered to correspond generally to the convergence angle of the focused light 312 incident upon fiber end face 104 at front focus $f_F$. In an example, focus spot 401 is formed substantially at aperture 256, e.g., to within +/−100 microns.

The focused light 312 that forms focus spot 401 is of sufficient intensity and duration to laser polish fiber end face 104 to a high degree of uniformity. This final polishing is accomplished in one non-contact step, in contrast to the prior art approach of having to use multiple manual polishing steps with polishing pads having finer and finer grain size. Thus, in an example, no other polishing steps are required after the laser-polishing step is performed with QCL tool 200.

Once the laser-polishing of fiber end 104 is completed using QCL tool 200, the front-end section 25 of ferrule 20 is disengaged from the front-end 212 of housing 210 and the process can be repeated for a new ferrule 20 and new optical fiber 100.

In an example, focus spot 401 can be scanned over the fiber end 104. This embodiment allows for a smaller focal spot with a higher intensity while keeping the QCL power relatively low.

Example Operating Parameters

The following example operating parameters for QCL light source 300 to perform non-contact polishing end face 104 of optical fiber 100 were deduced by experiments carried out on example single-mode optical fibers 100: wavelength λ in the range from 5.5 microns to 10.6 microns, with 6.2 microns being an exemplary wavelength; a laser mode-field diameter MFD that is substantially the same as the diameter of the fiber end face 104 (e.g., in one example to within +/−10% or in another example to within +/−5% or in another example to within +/−2%) and which in an example can be in the range from 20 microns to 150 microns or from 20 microns to 100 microns, depending on the type of optical fiber 100; an average optical power emitted from QCL unit 310 in the range from 100 to 600 mW, with an exemplary value being 150 mW; a peak optical power emitted from QCL unit 310 in the range from 400 to 1000 mW, with an exemplary value being 450 mW; a pulse repetition rate in the range from 10 Hz to 1000 Hz, with an exemplary value being 50 Hz; and a duty cycle in the range from 5% to 100% using a continuous-wave (CW) laser, with an exemplary value being 30%.

In an example, focus spot 401 has a diameter that is in the range from 10% to 110% of the diameter of end face 104 (e.g., from 25 microns to 150 microns for a 125-micron diameter optical fiber). In another example, focus spot 401 has a diameter that is in the range from 30% to 110% of the diameter of end face 104, while in another example is in the range from 90% to 110%. A focus spot 401 that has substantially the same diameter as end face 104 has a diameter that is within +/−10% of the diameter of the fiber end face.

These parameter ranges are not intended as limiting and the exact processing parameters can be readily deduced based on the above example parameter ranges by those skilled in the art depending on the particular optical fiber 100 being used.

An example method of polishing fiber end face 104 using QCL tool 200 is as follows. 1) the optical fiber 100 is cut using a low-cost method, e.g., using scissors, a mechanical cutting tool, or other device; 2) a portion (e.g., about 4 mm) of the 250 microns thick optical fiber coating 114 that covers the glass portion (i.e., core 110 and cladding 112) of the optical fiber 100 is removed to form bare end portion 102; 3) the bare end portion 102 is inserted into bore 30 of ferrule 20 at ferrule back end 24 and then urged forward so that it resides in bore front-end section 32, with the optical fiber being secured in bore 30 using a bonding material, so that the bare end portion has a protrusion distance DP of about 100 μm; 4) the end face 104 of protruding bare end portion 102 is coarsely polished (e.g., using a polishing pad with a 0.5 µm grain size) so that the protrusion distance DP 250 nm; 5) The fiber end face 104 is irradiated with focused light 312 from QCL 310 as described above; and 6) mechanical clamping and strain relief is then provided (e.g., to withstand a 2 lb-f to 8 lb-f of pulling force).

Because the fiber end face 104 can be relatively small (e.g., 125 microns in diameter), and because the mode-field diameter MFD at the rear focus $f_R$ is preferably about the same size as the fiber end face, proper alignment of the fiber end face at the rear focus $f_R$ is preferred to obtain the best polishing results. This alignment can be done using a number of methods. One approach for field operation is passive alignment. In this case, the opening 232 at the front end 212 of QCL tool 200 is sized precisely to receive and engage front end section 25 of ferrule 20 and hold the ferrule in place to within the required lateral and longitudinal misalignment tolerance. In an example, the lateral misalignment tolerance is nominally less than 10 microns and the axial misalignment tolerance is about 150 microns.

In another example alignment method, a camera is used to capture magnified images of the fiber end face 104 as it is being irradiated with relatively low-power focused light 312. A user can then adjust one or more of the position of ferrule 20, the position of focusing optical system 400 or the position of QCL light source 300. Best alignment is achieved when the captured images show a uniform irradiation of fiber end face 104, as evidenced by a uniform and symmetric glow.

In establishing the example operating parameter ranges set forth above for QCL tool 200, high-magnification images of the fiber end face 104 were taken before and after laser polishing. Laser scanning microscope (LSM) profiles of the fiber end face 104 and the ferrule front-end face 23 were also taken to verify the protrusion distance requirement of DP 250 nm after laser polishing. The LSM profiles showed DP values of about 140 nm, which is well below the preferred limit. In an example, the non-contact laser-polishing step leaves the protrusion distance DP substantially unchanged, e.g., the protrusion distance DP is reduced in one example by no more than 10% or in another example by no more than 5%, or in another example by no more than 2%.

Most of the scratches and defects in fiber end face 104 are in the top 1 to 2 microns. Thus, in an example the optical power provided to the fiber end face 104 is selected to have a 1 to 2 micron absorption depth and to heat this portion of the glass to beyond its softening or melting point. As long as the glass is heated to this temperature, the surface tension effects smooth out the scratches and defects and reduce the back reflections.

The optimum pulse width and duty cycle provided by QCL light source 300 depends on the QCL wavelength and its absorption depth. Ideally, the pulse width is selected so that the diffusion length is matched to the absorption length. In this case, most of the delivered optical power is used to heat the volume of material determined by the beam cross section and absorption depth. For 6.2 micron QCL light source 300, the absorption depth in silica material is about 70 microns. The thermal diffusion times for such length scales are about 5 to 10 milliseconds. The QCL pulse widths in this range are best suited for 5 to 6 micron end modifications of silica. A 30% duty cycle with a pulse repetition rate of 50 Hz would lead to pulses in that range. The pulsed operation of QCL tool 200 reduces the average power by about 20 to 25% of the power needed for continuous-wave (CW) operation. For 9 micron QCL operation, the optimum pulse width can be even smaller because the absorption depth is smaller.

The choice of operating wavelength $\lambda$ for QCL unit 310 is driven by two main considerations. The first main consideration is the respective absorption wavelengths of silica-based optical fibers and Zirconia-based ferrules. It is preferred that the absorption of the optical fiber to the operating wavelength be high while the absorption of the ferrule to the operating wavelength be low. A high absorption of the optical fiber means that less optical power P is needed to heat the fiber end face. Yet, if the absorption is too high, the process may become unduly sensitive to power fluctuations and lead to process variability. A lower absorption of the ferrule means that the chance of laser damage to the ferrule front-end surface is reduced.

The second main consideration is the availability of single-stripe QCLs that operate at the desired power and wavelength. Even though QCLs are available over a wavelength range from 4 to 10 microns, the power available from a single stripe QCLs varies as a function of wavelength. The optical power P emitted by a QCL is generally in the range of 1 W to 2 W for a wavelength in the 4 microns to 7 microns range, and about 0.5 W at longer wavelengths.

In an example, in view of the above two main considerations, the operating wavelength $\lambda$ can selected to be between 5.2 microns and 6.5 microns. In this wavelength range, silica has relatively high absorption while the commonly used ferrule material Zirconia has relatively low absorption. Further, the QCLs in this wavelength range offer good optical power (up to about 1-2 W per stripe), good beam quality and are compact.

Coating Removal Configurations and Methods

Figure 4A:
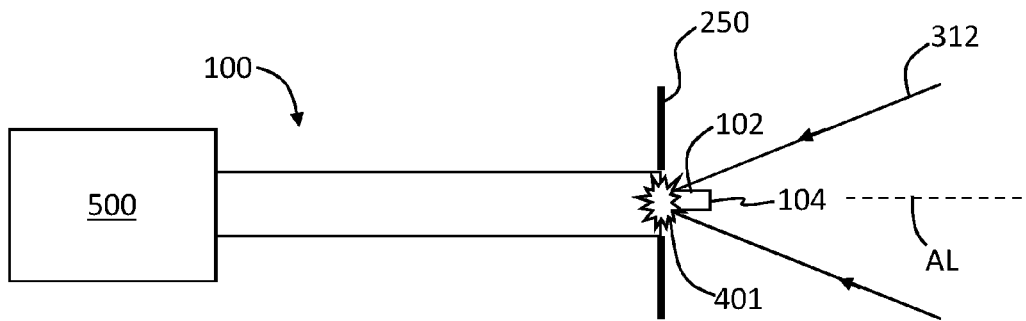
FIGS. 4A through 4C are schematic diagrams that illustrate an example of using the QCL tool to perform stripping of the optical fiber coating, wherein the optical fiber moves axially relative to a focusing lens system.
Figure 4B:
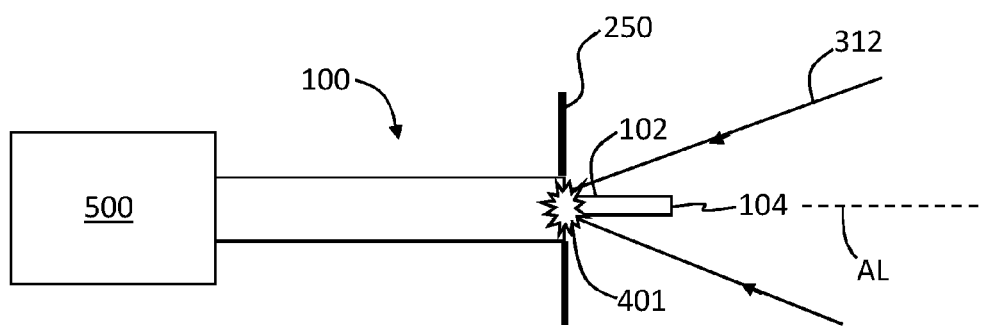
Figure 4C:
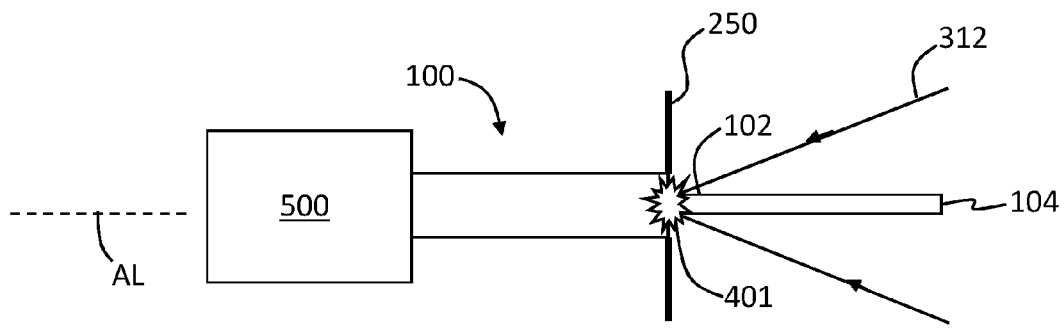

In an example embodiment, QCL tool 200 can be used to perform optical fiber stripping, wherein a select portion of coating 114 of optical fiber 100 is removed to form bare end portion 102. FIGS. 4A through 4C are schematic diagrams that illustrate an example method of using QCL tool 200 to perform stripping of coating 114.

The example stripping method includes holding optical fiber 100 in a fiber holder 500 that allows for the optical fiber to be axially translated along the housing axis AH of QCL tool 200 and thus along the optical axis of focusing lens system 400. The fiber holder 500 can be similar to ferrule 20 in that it can have a front-end portion sized to fit into opening 232 at front end 212 of housing 210, and can have a bore similar to bore 30 but sized can accommodate a coated optical fiber 100. The stop member 250 in QCL tool 200 used for end face polishing can be replaced with a similar stop member wherein aperture 256 is large enough to pass optical fiber 100 with coating 114 in place. Alternatively, the same stop member 250 can be used, as long as the focus spot is formed at or beyond aperture 256 (i.e., toward the fiber holder 500). This is possible because the intensities required to remove coating material is substantially lower than the values required to "polish" the glass fiber end face.

To carry out the stripping method, a coated end portion of optical fiber 100 is axially guided toward aperture 256 of stop member 250 and then is urged forward. Meanwhile, QCL unit 310 is activated so that light 312 is directed to aperture 256, e.g., focused at front focus $f_F$. Thus, the coated optical fiber 100 travels along the optical axis AL of focusing lens system 400. The QCL light 32 has sufficient intensity to burn or ablate coating 114, leaving bare end section 102 of a desired length, as shown in FIG. 4C. The bare fiber section 102 grows in length as optical fiber is continuously urged forward and more and more of coating 114 is removed. This process continues until a select length of bare end portion 102 is formed.

It is noted that QCL light 312 need not be focused to perform the above stripping method. All that is required is that the QCL light have sufficient intensity to melt or ablate the material that makes up coating 114. In one example, this can be achieved by focusing QCL light 312, and this focusing can be relatively weak. This is because substantially less optical power is required to remove coating 114 than to polish the glass portion (i.e., cladding 112 and core 110) of optical fiber 100. Consequently, QCL light 312 at front focus $f_F$ need not be as concentrated as for the polishing process (i.e., focus spot 401 can be larger than for the polishing process), and QCL unit 310 can be operated in a lower power regime.

Figure 5:
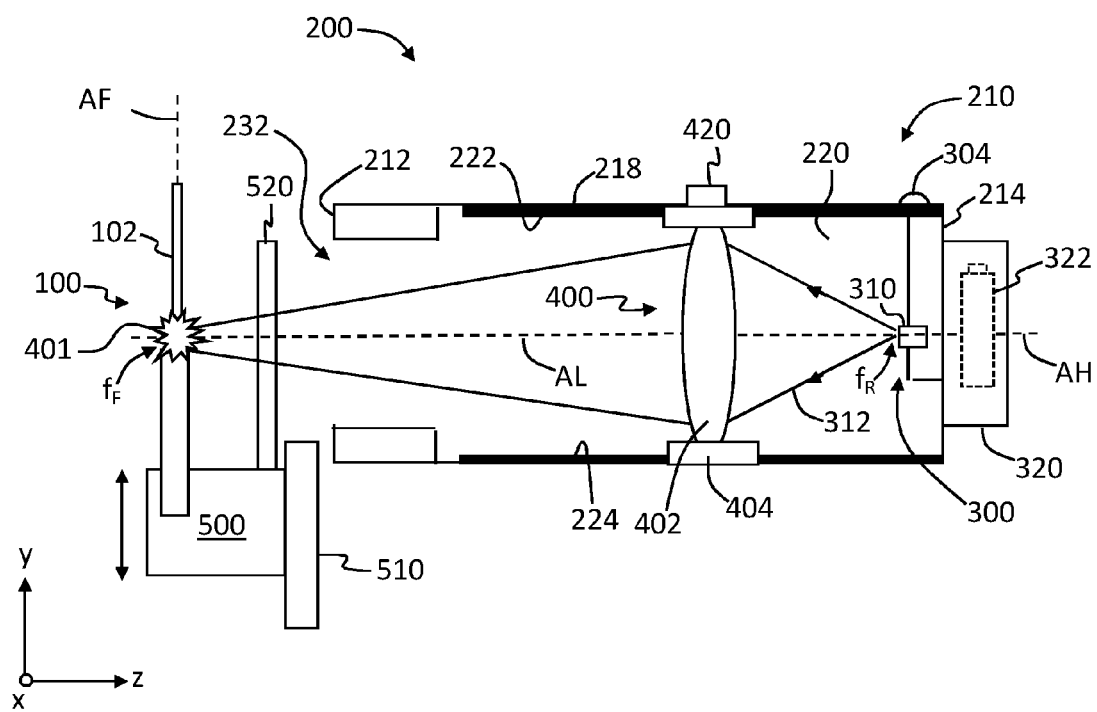
FIG. 5 is a schematic diagram that illustrates another example of using the QCL tool to perform stripping of the optical fiber coating, wherein the optical fiber moves laterally relative to a focusing lens system.

FIG. 5 is a schematic diagram of another example configuration of QCL tool 200 for performing stripping of coating 114 from optical fiber 100. The holder 500 is supported by a translation stage 510 and also includes a vertically oriented debris shield 520. The stop member 250 is removed and focusing optical system 400 is adjusted to have its front focus $f_F$ (and thus the location of focus spot 401) a select distance in front of front end 212 so that light 312 can irradiate optical fiber 100. Thus, the stripping configuration of FIG. 4 has a lateral geometry wherein the optical fiber axis AF is generally perpendicular to optical axis AL of focusing lens system 400.

The optical fiber 100 is supported by holder 500 in the y-direction and can be translated through focus spot 401 in the direction along the optical fiber axis AF, i.e., in the y-direction (and thus substantially perpendicular to optical axis AL) by translation stage 520. Thus, light 312 is incident upon fiber 100 from the side, e.g., at substantially a right angle between the optical axis AL and the fiber axis AF. The translation of optical fiber 100 through focus spot 401 results in coating 114 being melted off or ablated, leaving a desired length of bare end section 102.

In an example, holder 500 is configured to also rotate optical fiber 100 about its axis AF while the optical fiber is being irradiated. The debris shield 520 is substantially transparent to light 312 and prevents any melted or ablated coating material or other contaminants from entering housing 210 at open front end 232. The debris shield 520 can also be arranged immediately at open front end 232 to seal off interior 220. As noted above, because less optical power is required for the stripping of coating 114 as compared to the polishing operation, light 312 can form a larger focus spot 401. In an example, the focus spot 401 for performing the stripping method disclosed herein can be a few hundred microns in diameter.

Note that in an example, the bare end portion 102 is formed by stripping off a section of coating 114 using QCL light 312 from the same QCL unit 310 that is used to polish the end face 104 of the bare end portion. In other words, the same QCL tool 200 can be used to perform non-contact optical fiber stripping as well as non-contact optical fiber end face polishing. This allows the same QCL tool 200 to perform two the main optical fiber processing steps when performing connectorization. This greatly simplifies the connectorization process, which makes QCL tool 200 particularly suitable for field connectorization (i.e., field-installable connectors). QCL tool 200 may alternatively or additionally be used in manufacturing environments to perform factory connectorization in a way that may be less complex and/or costly than traditional processes and equipment.

Fiber End Face Bump

Figure 6A:
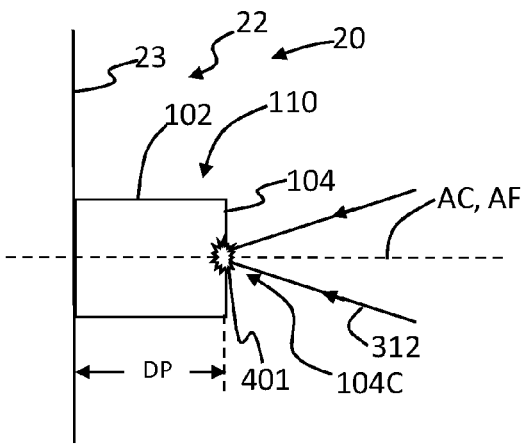
FIGS. 6A and 6B are similar to FIGS. 2D and 2C respectively, and illustrate the formation of a bump on a central portion of the end face of the bare fiber section.
Figure 6B:
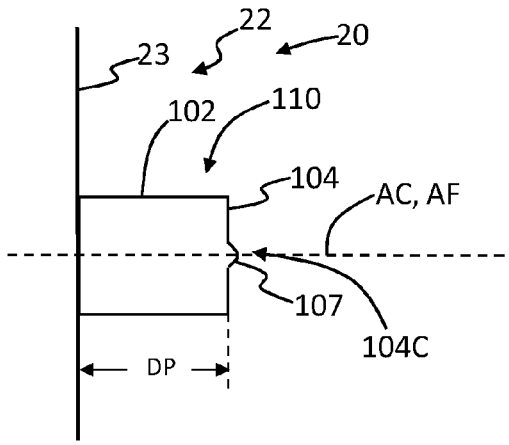
Figure 6C:
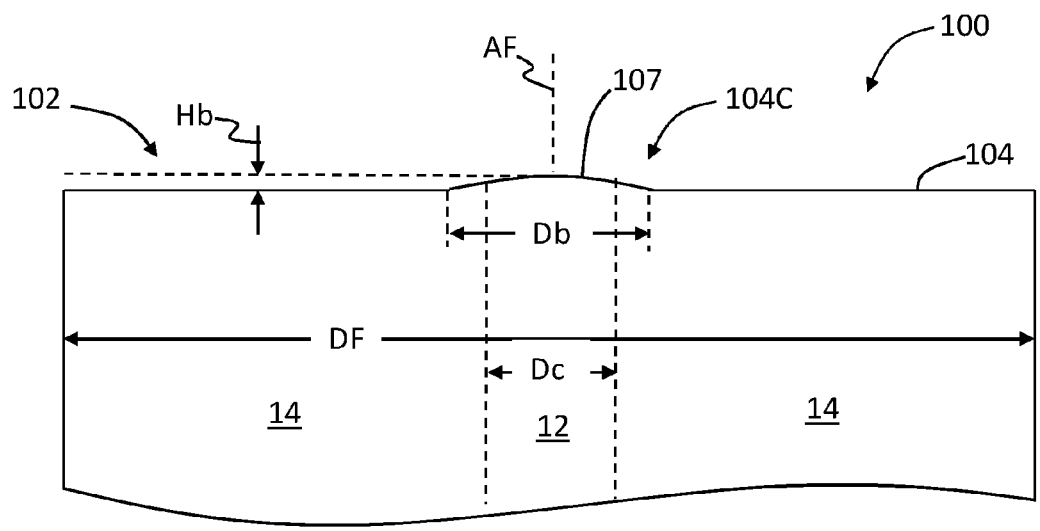
FIG. 6C is a close-up end view of the end face of the optical fiber and showing the bump formed on the central portion of the end face.

In an example embodiment illustrated in FIGS. 6A through 6C, QCL tool 200 can be used to process fiber end face 104 in a manner that results in a center portion 104C of the fiber end face having a bump 107, sometimes referred to as a "micro-bump" or "nano-bump." As illustrated in FIGS. 6A and 6B, the formation of bump 107 is accomplished in one example by bringing focus spot 401 to a tight focus on center portion 104C of fiber end face 104, and providing the focus spot with sufficient energy to cause localized expansion of the glass matrix.

FIG. 5C is a close-up view of fiber end face 104 and shows bump 107 formed on the center portion 104C and having a bump diameter Db and a bump height Hb as measured along or parallel to axis AF. The fiber diameter DF of optical fiber 100 (i.e., outer diameter of cladding 114) is also shown, as is a diameter Dc of core 12. In an example, bump 107 has a diameter Db in the range from 25 microns to 75 microns, with an exemplary diameter range being 30 microns to 40 microns. Also in an example, the bump height Hb can be in the range from 25 nm to 150 nm, or even 50 nm to 100 nm, with an exemplary range being 80 to 100 nm. In an example, the fiber diameter DF is nominally 125 μm. In the discussion herein, the bump height Hb is not considered as part of protrusion distance DP. The bump height Hb may in fact be measured from the portion of the end face 104 that defines the protrusion distance DP immediately prior to forming bump 107 (i.e., prior to bringing focus spot 401 to the tight focus for forming bump 107).

The bump 107 is substantially centered on optical fiber axis AF and thus is also substantially centered on core 112. The convex shape of bump 107 provides improved physical contact between fiber end faces 104 of connected optical fibers 100. The formation of bump 107 also serves to anneal the glass that makes up the bump, thereby resulting in increases localized strength of the glass matrix. This is beneficial with respect to being able to withstanding the contact pressure between two interfaced fiber end faces 104 when making a connection between two optical fibers 100. The annealing also serves to substantially reduce or eliminate defects present in fiber end face 104 where bump 107 is located. In an example, the formation of bump 107 is carried out during the polishing process or is carried out as a separate irradiation step either before or after the polishing process.

In some embodiments, the protrusion distance DP and bump height Hb may be such that the end face 104 does not protrude more than 250 nm beyond the ferrule front-end surface 23. In other embodiments, such as those where QCL tool 200 is used in a factory operation, the overall protrusion may be even lower (e.g., the protrusion distance DP and bump height Hb may be such that the end face 104 does not protrude more than 50 nm beyond the ferrule front-end surface 23). Note that the bump height Hb may be zero in above-mentioned embodiments, as forming bump 107 may not be required in all embodiments.

It will be apparent to those skilled in the art that various modifications to the embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:
1. A method of processing an optical fiber having a coating formed on a glass waveguide that includes an end face having a diameter, comprising:
   supporting the optical fiber in a ferrule so that a bare end section of the optical fiber that defines the end face protrudes from an end of the ferrule;

polishing the end face with a polishing pad so that the end face protrudes from the end of the ferrule by a protrusion distance DP; and
irradiating the end face of the bare end section with light from a quantum cascade laser (QCL) to further polish the end face;
wherein the light has a wavelength in the range from 5.5 microns to 10.6 microns, wherein the light forms a focus spot substantially at the end face having a diameter that is 10% to 110% of the diameter of the end face, and wherein the light has an average power in the range from 50 mW to 600 mW.

2. The method according to claim 1, wherein the light includes light pulses having a peak power in the range from 400 mW to 1000 mW.

3. The method according to claim 2, wherein the light pulses have a repetition range from 10 Hz to 1000 Hz.

4. The method according to claim 3, wherein the light pulses have a duty cycle in the range from 5% to 100%.

5. The method according to claim 1, wherein the focus spot substantially at the end face of the optical fiber has a diameter defined by a mode-field diameter that is in the range from 20 microns to 125 microns.

6. The method according to claim 1, including forming the focus spot with a focusing lens system operably arranged between the QCL and the end face of the optical fiber.

7. The method according to claim 1, including forming the bare end section with light from the same QCL that is used to irradiate the end face of the optical fiber to polish the end face.

8. The method according to claim 1, further including forming a bump on a central portion of the end face of the optical fiber by irradiating the central portion of the end face, with light from the QCL, wherein the bump has a bump diameter Db in the range from 20% to 50% of a fiber diameter DF of the optical fiber and a height in the range from 50 nm to 100 nm.

9. A method of processing an optical fiber having a fiber diameter DF and a coating formed on a glass waveguide that includes an end face, comprising:
a) supporting the optical fiber in a ferrule having a ferrule front end with a ferrule front-end surface, with the optical fiber having a bare end portion formed by the glass waveguide, and wherein the bare end portion includes the end face and protrudes beyond the ferrule front-end surface by a protrusion distance DP;
b) irradiating the end face of the bare end portion with focused light from a quantum cascade laser (QCL) to polish the end face; and
c) forming a bump on a central portion of the end face, the bump having a bump diameter Db in the range from 20% to 60% of the fiber diameter DF and a height in the range from 50 nm to 100 nm, and wherein the protrusion distance DP and height of the bump are such that the end face does not protrude more than 250 nm beyond the ferrule front-end surface.

10. The method according to claim 9, wherein the focused light comprises at least one of the following features (i) to (vi):
i) a wavelength in the range from 5.5 microns to 10.6 microns;
ii) a focus spot with a mode-field diameter (MFD) in the range from 20 microns to 1.00 microns,
iii) an average power in the range from 100 mW to 600 mW;
iv) a peak power in the range from 400 mW to 1000 mW;
v) a repetition range from 10 Hz to 1000 Hz; or
vi) a duty cycle in the range from 5% to 100%.

11. The method according to claim 9, further comprising:
operably engaging the ferrule front end with an open front end of a housing that houses the QCL and a focusing lens system operably arranged adjacent the QCL; and
using the focusing lens system to form a focus spot substantially at the end face of the optical fiber.

12. The method according to claim 11, wherein the end face of the optical fiber has a diameter, wherein the housing includes a stop member having an aperture formed therein, the method further including;
directing a focused light beam from the focusing lens system through the aperture, wherein the aperture has a diameter that is substantially the same as a diameter of the end face of the optical fiber.

13. The method according to claim 11, wherein the focusing lens system has an optical axis on which the focus spot is formed, and wherein prior to step a), a portion of the coating is removed by axially translating the optical fiber along the optical axis and through the focus spot.

14. The method according to claim 11, wherein the focusing lens system has an optical axis on which the focus spot is formed, and wherein prior to step a), a portion of the coating is removed by laterally translating the optical fiber through the focus spot in a direction perpendicular to the optical axis.

15. The method according to claim 9, wherein the ferrule is part of an optical fiber connector.

16. The method according to claim 9, wherein prior to step a), the bare end portion is formed by stripping off a section of the coating using light from the same QCL that is used to polish the end face of the optical fiber.

17. The method according to claim 9, wherein the protrusion distance DP and height of the bump are such that the end face does not protrude more than 50 nm beyond the ferrule front-end surface.

18. The method according to claim 9, wherein the bump diameter Db is in the range from 25 microns to 75 microns.

19. A device for processing an optical fiber supported by a ferrule having a front-end section, the optical fiber having a coating formed on a glass waveguide that includes an end face having a diameter, the device comprising:
a housing having a housing axis, an open front end, a back end, and an interior, wherein the open front end is configured to receive and engage the front-end section of the ferrule, with a bare end portion of the optical fiber protruding from the front-end section;
a stop member arranged along the housing axis and spaced apart from the open front end of the housing, the stop member being configured so that the front-end section of the ferrule can be inserted into and engaged by the open front end of the housing, and wherein the stop member has an aperture that, resides on the housing axis;
a quantum cascade laser (QCL) operably arranged within the interior of the housing and that emits light having a wavelength; and
a focusing lens system operably arranged between the stop member and the QCL and that is configured to receive the light from the QCL and form a focus spot at a front focus position that is substantially at the aperture of the stop member;
wherein, when the ferrule engages the open front end of the blousing, the end face of the optical fiber resides substantially at the aperture of the stop member and is irradiated by the focus spot that acts to polish the end face of the optical fiber; and wherein the focusing lens system includes at least one lens that is configured to move to adjust the front focus position.

20. The device according to claim 19, wherein the QCL is powered by a battery system that includes at least one battery.

21. The device according to claim 19, wherein the QCL and focusing lens system are configured to define the focus spot on a central portion of the end face of the optical fiber, and provide the focus spot with optical power sufficient to form a bump on the central portion of the end face, wherein the bump has a bump diameter Db in the range from 20% to 60% of a diameter DF of the optical fiber.

22. The device according to claim 19, wherein:
  i) the wavelength is in the range from 5.5 microns to 10.6 microns;
  ii) the focus spot has a diameter that is within +/−10% of the end face diameter; and/or
  ii) the QCL has an average power in the range from 100 mW to 600 mW, a peak power in the range from 400 mW to 1000 mW, a repetition range from 10 Hz to 1000 Hz, and a duty cycle in the range from 5% to 100%.

\* \* \* \* \*